United States Patent [19]
Hendrix et al.

[11] Patent Number: 5,144,135
[45] Date of Patent: Sep. 1, 1992

[54] IMAGE PLATE SCANNER

[76] Inventors: Jules Hendrix, Notkestrasse 85, D-2000 Hamburg 52; Arno Lentfer, Bacherweg 5c, D-2000 Hamburg 61, both of Fed. Rep. of Germany

[21] Appl. No.: 689,268
[22] PCT Filed: Sep. 22, 1990
[86] PCT No.: PCT/EP90/01612
  § 371 Date: May 24, 1991
  § 102(e) Date: May 24, 1991
[87] PCT Pub. No.: WO91/04629
  PCT Pub. Date: Apr. 4, 1991

[30] Foreign Application Priority Data
Sep. 24, 1989 [DE] Fed. Rep. of Germany ....... 8911380

[51] Int. Cl.$^5$ ............................................ G01N 23/04
[52] U.S. Cl. .................................................. 250/327.2
[58] Field of Search ........................... 250/327.2, 484.1

[56] References Cited
U.S. PATENT DOCUMENTS

| | | |
|---|---|---|
| 3,712,955 | 1/1973 | Miller . |
| 4,922,101 | 5/1990 | Hashive ............................. 250/327.2 |
| 4,922,102 | 5/1990 | Katayama ..................... 250/484.1 B |
| 5,003,570 | 3/1991 | Whiting ................................. 378/75 |

FOREIGN PATENT DOCUMENTS

| | | |
|---|---|---|
| 59-52457 | 3/1984 | Japan . |
| 306760 | 12/1988 | Japan . |

OTHER PUBLICATIONS

"Maximum Performance Quasi Closed Loop Scanner Servo", Howard et al., Research Disclosure, Jan. 1981, p.s., Hampshire, GB.

Primary Examiner—Carolyn E. Fields
Attorney, Agent, or Firm—Antonelli, Terry, Stout & Kraus

[57] ABSTRACT

An improved image plate scanner (10) for scanning a circular videodisk (12) exposed by X-rays, with image elements (40) spaced a distance (radius R) away from the image plate central point. The image plate is scanned with laser beams. A videodisk carrier (13) on which the image plate is detachably mounted, is drivable with the aid of an electromotor (11), with adjustable rotation speeds. An image element scanning unit (15;115) is radially displaceable across the image plate by means of a drive assembly (14,18) with presettable speed of advance. A laser light supply (42) and an optical image element scanning facility (30a) are parts of an optoelectronic measured value transmission unit, as are a photomultiplier (36) and a signal conditioner. During the light scanning for recording the image stored on the image plate maximum light yield is obtained for the emitted light. The image plate scanner is constructed in a compact manner so as to facilitate operation. The image element scanning unit (15;115) can be guided across the image plate while scanning each image element (40) at the same tangential speed, provision being preferably made for the laser light supply (42) to include a collector lens (44), two laser light sources (43a, 43b), and an optical filter (46) by means of which the laser light is focussed. The drive shaft (18) of the electromotor (11) is connected by a gear drive to a power spindle (26). The image element scanning unit (15) is translatorily displaceable radially over the image plate (12).

21 Claims, 13 Drawing Sheets

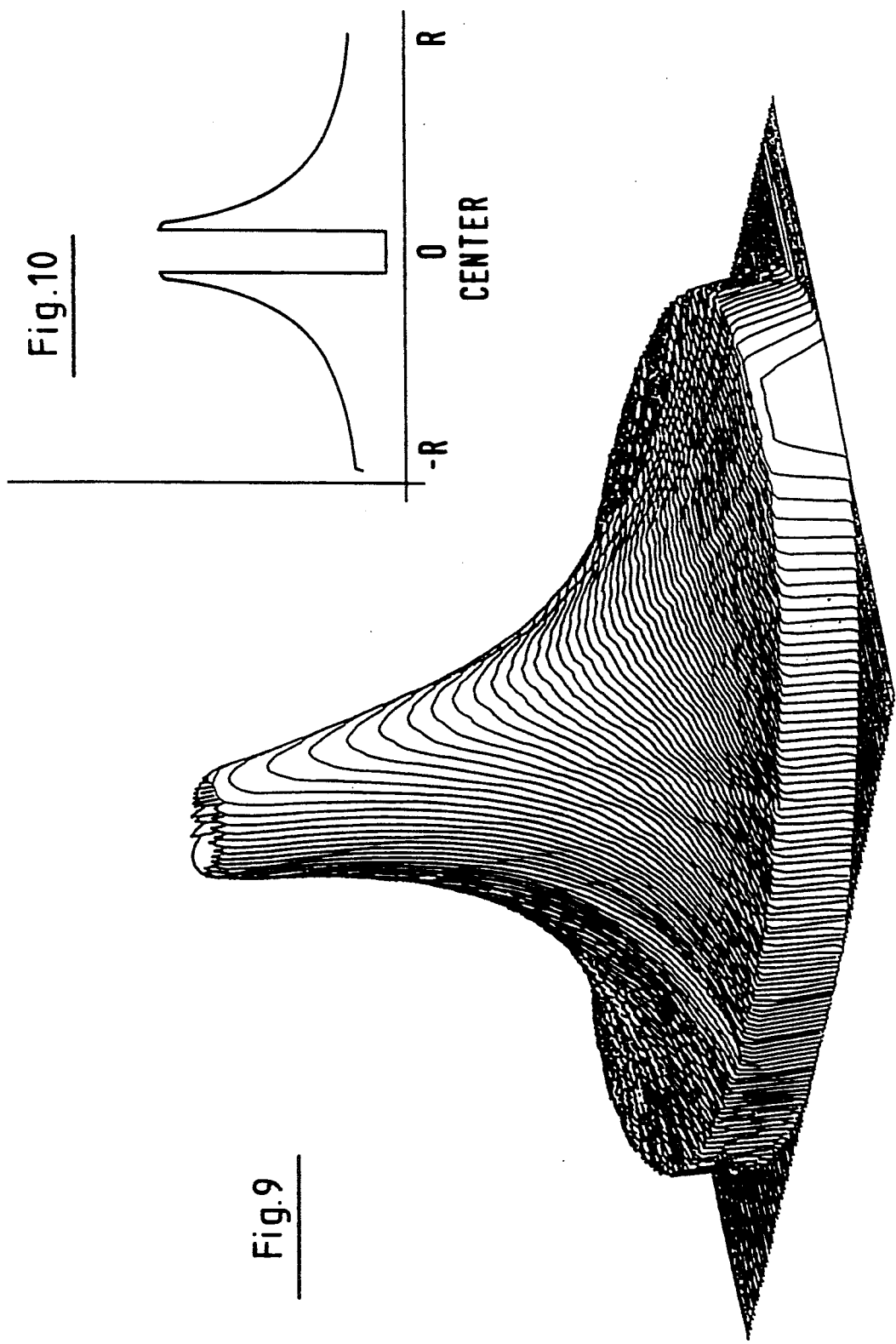

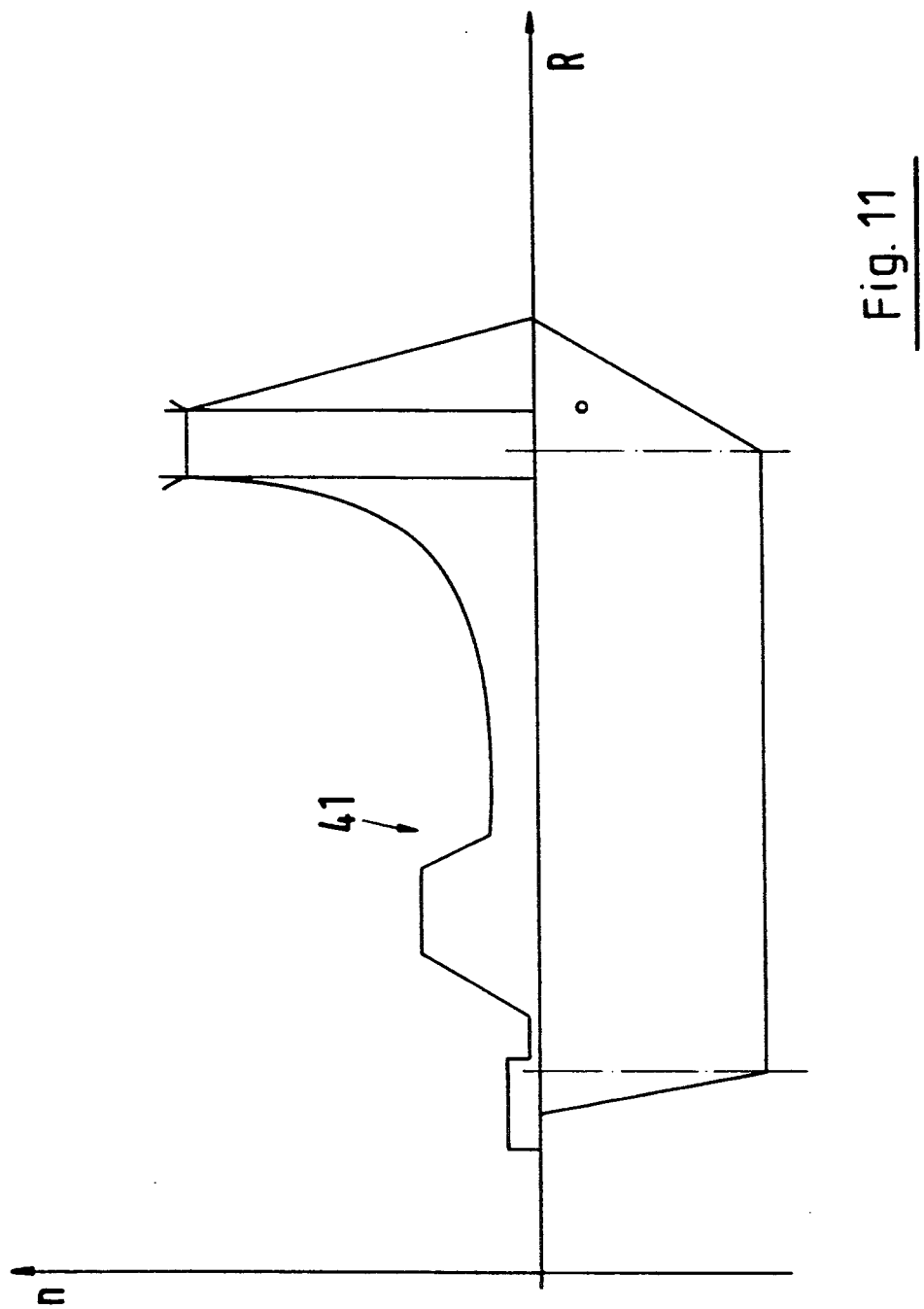

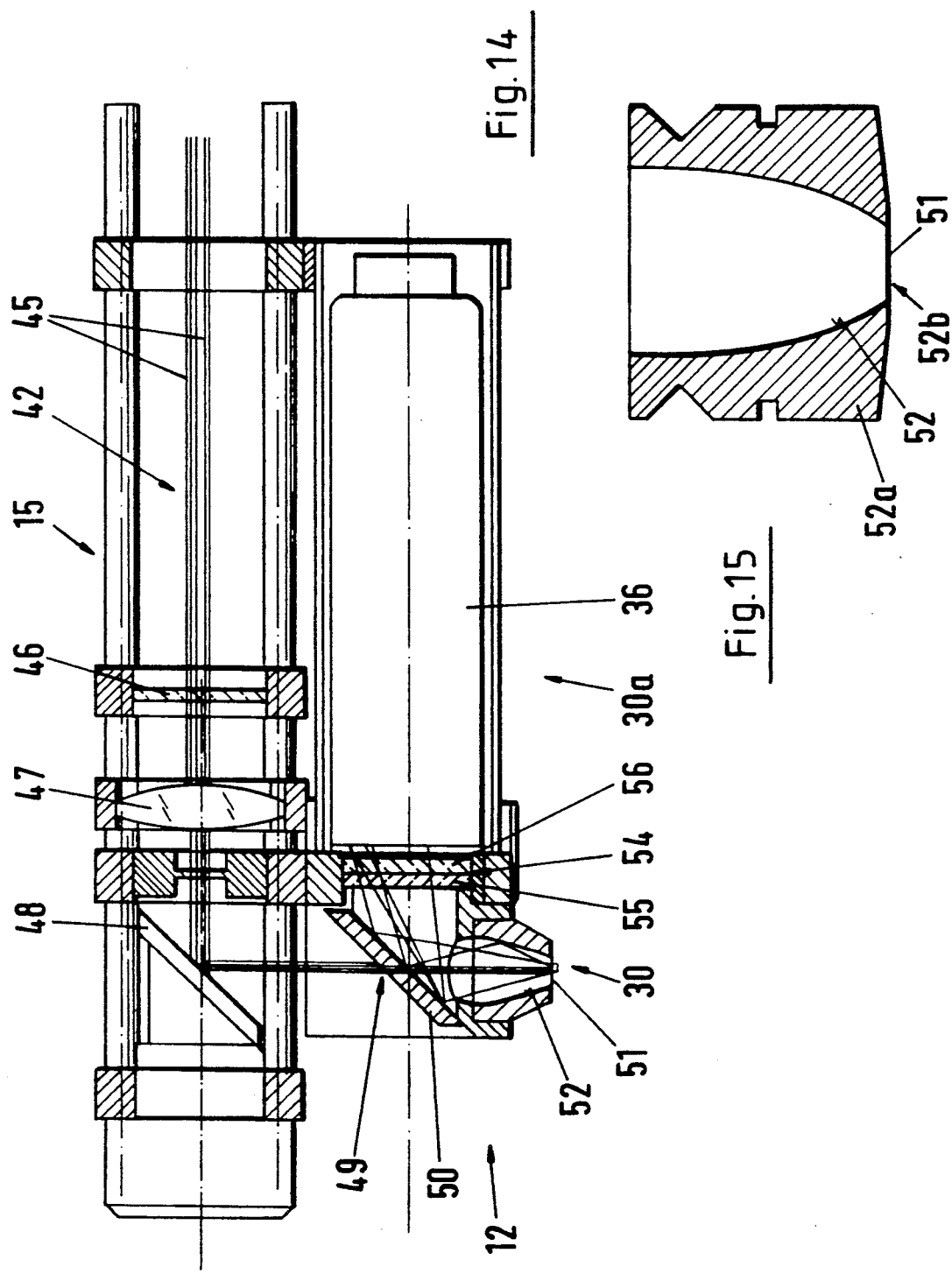

IMAGE PLATE SCANNER

SCOPE OF APPLICATION

The present invention relates to an image plate scanner for a device for scanning an image plate exposed by X-rays with the aid of laser beams.

STATE OF THE ART

From the EP-A-144 856 it is known to expose image plates in which, on a substrate material, a stimulable phosphor layer of BaFEu:X-crystals is disposed in a binding agent with the aid of X-rays. The recording of the X-ray image is effected by the action of the X-rays on the BaFEu:X-crystals. For the image plate scanning, the image plate is scanned with laser light, whereby the different quantities of X-rays absorbed by the image plate are converted into light possessing equivalent intensities. The light is then first converted into analog electrical signals, then into digital signals, following which the digitized image is processed further in a computer. The residual image quantity remaining on the image plate subsequent to the image plate scanning is then deleted in that the image plate is exposed to light. The thusly treated image plate can then be reused for image recording with the aid of X-rays. However, image plate scanners which are already known are subject to the disadvantage that the light yield in the image plate scanner is impaired, due to the circumstance that the sensitivity of the image plate scanner is unsatisfactory for many fields of application.

In order to improve the known image plate scanners, with the EP-OS 296 365, an image plate scanning device is proposed in which an image plate in the form of a circular plate is disposed on a rotatable disk carrier, the image plate being in this case constructed so as to be suitable for the storage of a beam image. The image plate carrier is provided with an electromotor having adjustable speeds, on whose drive shaft the image plate is detachably mounted. The image plate is scanned by means of an image element scanning unit while the image plate is in rotation, and the image element scanning unit is made to travel radially across the image plate at a preset speed of advance. In this case the image plate is subjected to radiation by a laser light from an He-Ne laser as a light source, and the image element scanning unit records the luminescence produced by the image plate at every specific point and is connected to a photomultiplier and a signal conditioning or preparation means. This image plate scanning device operates in such a way that the image dots to be scanned are indicated in a polar system of coordinates as a function of the radius R and the angle theta, and the pertinent intensities are detected with the aid of the image element scanning unit, while the speed of the frame supporting the image plate scanning unit is in a predetermined relationship to the rotational speed of the image plate carrier. In this case it is always the ease that the image plate scanning unit is displaced radially inwardly at a certain speed per rotation of the image plate so that the image plate is scanned in its entirety. Here the scanning is effected in concentric circles.

Since the velocity of the image plate is not changed, the closer the image element scanning unit approaches the central point of the image plate, the duration of the scanning per image element becomes increasingly longer radially form the outside toward the inside, i.e. the recording times within the outer area are extremely short. The drive assemblies for the image plate and for the radial adjustment of the image element scanning unit are independent of each other so that it is not ensured that, when scanning image plate to be compared, the scanning is invariably begun at the same starting point. This would lead to the generation of dissimilar scanning results.

Also in the devices proposed in the FR-A-34 38 300 and in the JP-Sho 63306760, spiral scanning is provided, however, no provision is made for uniform scanning. From the DE-OS 30 14 433, an assembly for the scanning of masters provided with graphic patterns is known, in which it is possible to determine the position of image dots of pixels with a great degree of accuracy because provision is made for the scanning carriage, which is displace along predetermined straight scanning lines, to be equipped with two scanners which can specific marks on clocking rulers so as to make it possible that an allocation of the scanned marks to the generated signals can take place. A image plate rotational position coder or a image plate radius coder is not provided in the assembly according to this publication.

TECHNICAL PROBLEM, SOLUTION, ADVANTAGES

It is the object of the invention to improve an image plate scanner of the type stated above in such a way that, during the light scanning for recording the image stored on the image plate, as large as possible a light yield is achieved for the emitting light, in which case the image plate scanner should be constructed in a compact manner so as to facilitate the operation.

According to the invention, the solution of the technical problem is brought about by means of an improved image plate scanner. With the aid of this improved image plate scanner, optimal scanning and recording of an image plate takes place, since the adaptation of the speed to the kinematic conditions is effected in such a way that each image element is scanned at the same tangential speed. The central concept in this case is that the image element scanning unit is passed across the image plate in dependence on the radius R of the respective image element and in such a way that all scannable fields are swept over at the same speed.

DESIGN OF THE INVENTION

Preferred embodiments and further developments of the invention are set forth below.

Provision is made in this connection for it to be possible for the image element scanning unit to be passed rapidly across the image plate at a velocity which is inversely proportional to the radius R of the respective image element and/or that the image plate can be driven at a rotational speed (rotational position speed) which is inversely proportional to the radius R of the respective image element.

Moreover, by preference, a rigid coupling is provided between the scanning motion and the rotational motion of the image plate so as to ensure a starting point which is the same at all times. In addition, by preference, the employment of two lasers is proposed in order to provide a compact and inexpensive device.

BRIEF DESCRIPTION OF THE DRAWINGS

In the following description the invention will be explained in greater detail with reference embodiments of an image plate scanner that are schematically illustrated in the drawings. Thus

FIG. 9 shows a three-dimensional profile of the scanning speed;

FIG. 10 graphically depicts the scanning speed, and

FIG. 11 shows the rotational speed pattern during the scanning operation of a an image plate;

FIG. 14 shows the image element scanning unit in a side elevation;

FIG. 15 shows, in a section, the reflector of the image element scanning unit in an enlarged side elevation.

DETAILED DESCRIPTION OF THE INVENTION AND BEST MODE OF IMPLEMENTING THE INVENTION

Figure 1:
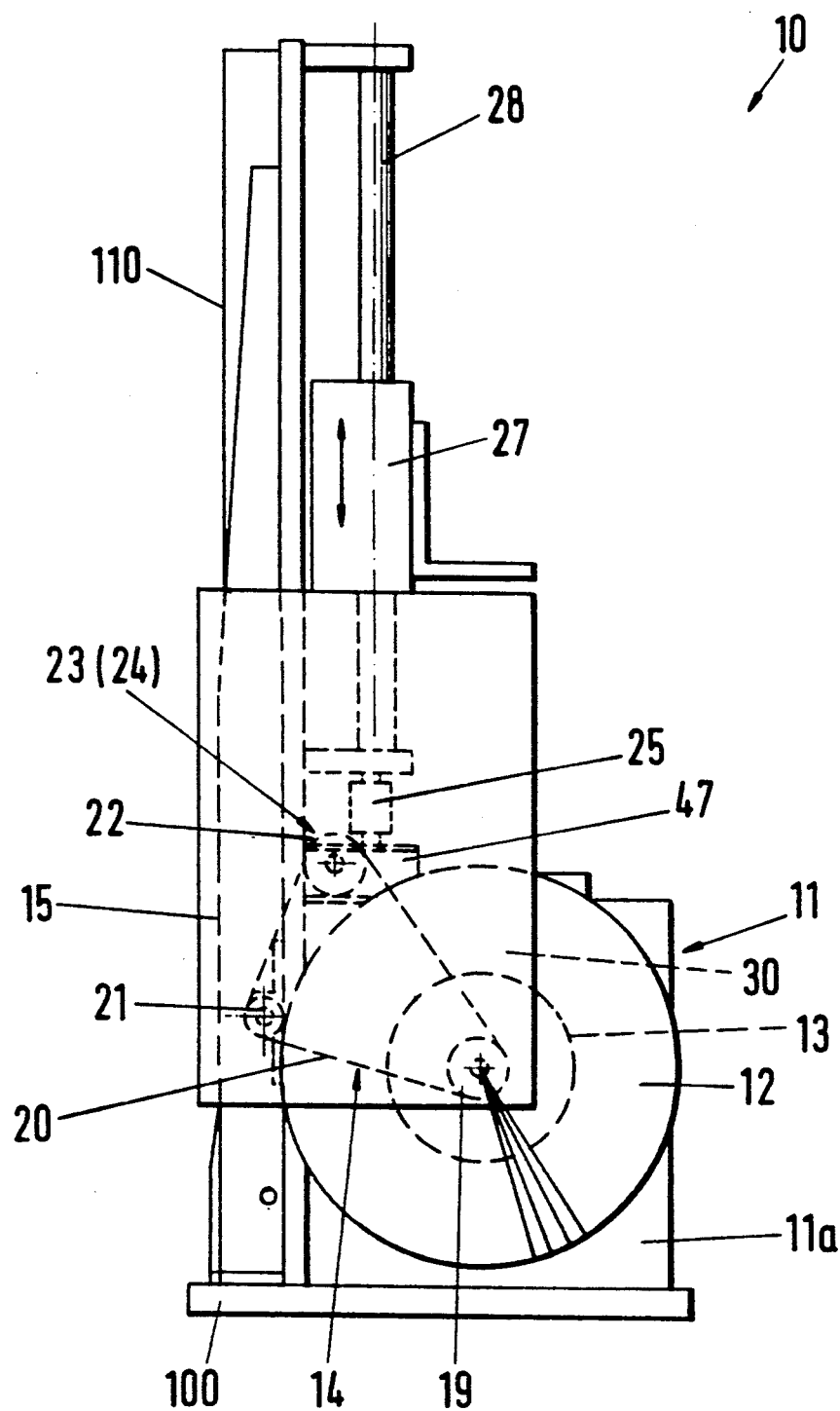
FIGS. 1-3 show, in a front view, a top view and a fragmentary side view, respectively, a further construction of an image plate scanner in diagrammatical depiction.
Figure 2:
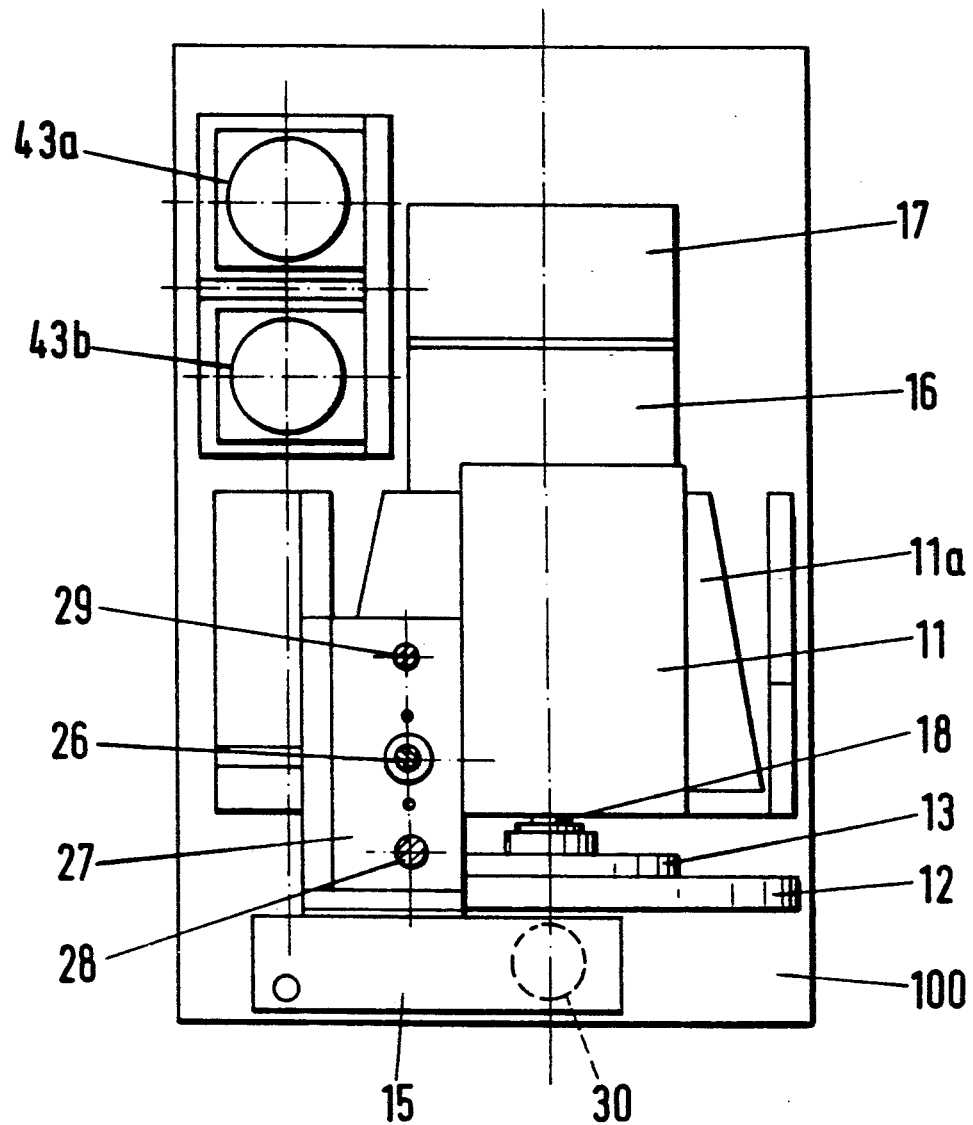
Figure 3:
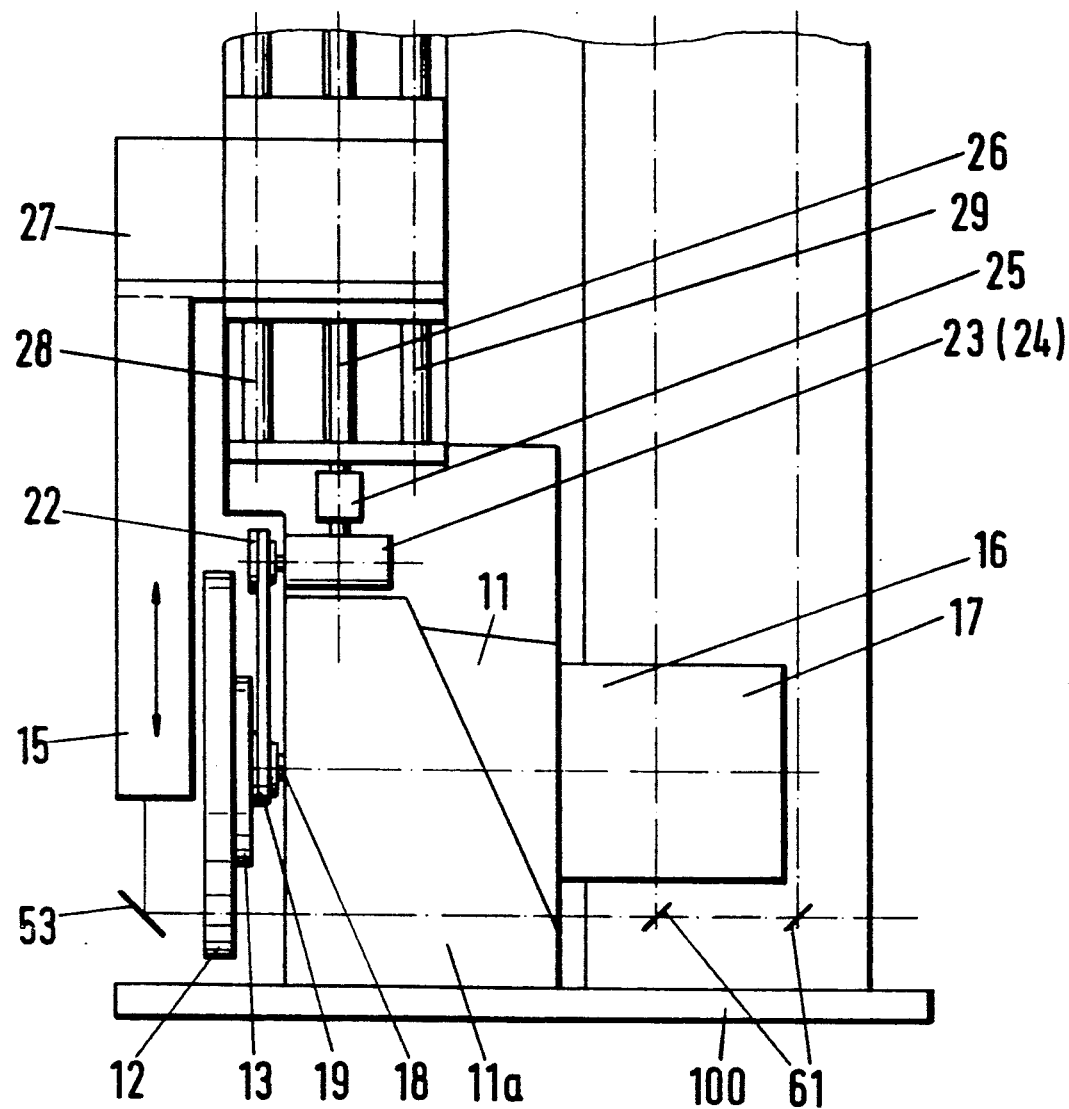

In FIGS. 1 to 3, a first embodiment of the image plate scanner 10 on a baseplate 100 on a retaining frame 110 is diagrammatically depicted. The image plate scanner 10 is provided with an electromotor 11 as driving motor which sets an image plate carrier 13 with a stimulable phosphor image plate 12 thereon into rotation and moves the image element scanning unit 15 in a translatory manner by means of a toothed belt drive 14. The electromotor 11 is connected to a tachogenerator 16 for controlling the rotational speed as well as for controlling a an image plate rotational position coder 17. A toothed belt wheel 19 of the toothed belt drive 14 is positioned on the drive shaft 18 of the electromotor 11. The toothed belt 20 passes across two further toothed belt wheels 21, 22, one of which is disposed on the shaft of a gear drive 23 constructed in the form of a worm gearing 24. This worm gearing 24 is connected to the power spindle 26 of the image element scanning unit 15 by means of a flexible coupling 25. The same is guided by means of a head support 27 on two guide rails 28, 29. The power spindle 26 passes through the head support 27. By displacement of the head support 27, the image element read head 30 is made to travel radially inwardly across the image plate 12 in such a way that the radial speed of advance is proportional to 1/radius R.

Figure 4:
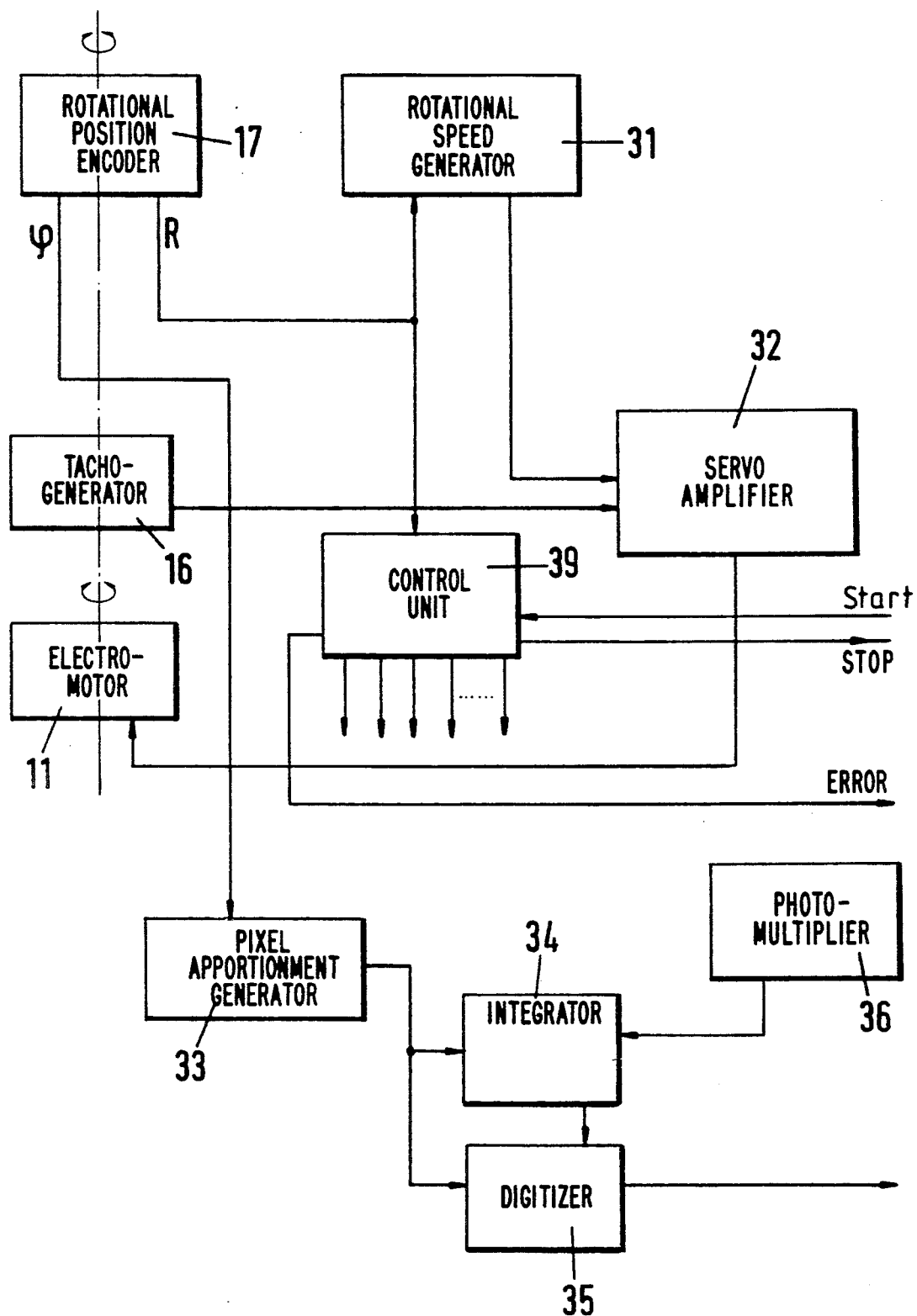
FIG. 4 is a functional block diagram of the image plate scanner according to FIGS. 1 to 3.
Figure 5:
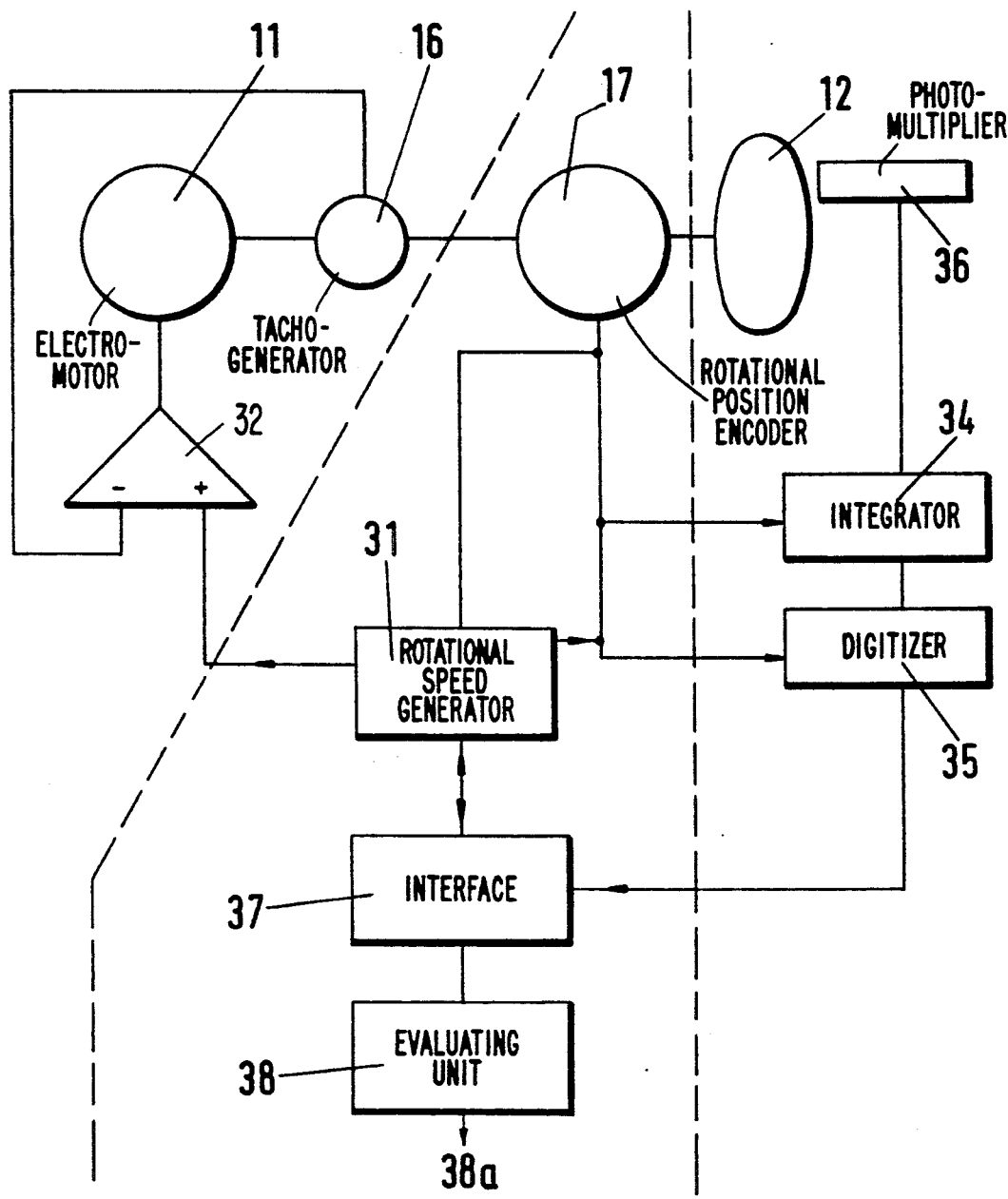
FIG. 5 is a diagrammatical illustration of the functional level of an image plate scanner.

FIGS. 4 and 5 illustrate the control sequence when the video scanner 10 is operated. The rotation speed generator 31 is activated by means of the image plate rotational position coder 17 which, by means of a servo amplifier 32, activates the electromotor 11 which is connected to the tachogenerator 16. The image plate rotational position coder 17 is further connected to the pixel apportionment generator 33 which is connected with an integrator 34 and with a digitizer 35. With the aid of the digitizer 35, the analog measured values of the photomultiplier 36 are converted into digital measured values of the image elements 40 (FIGS. 6 and 7) determined by special scanning of the image plate 12 and are processed further by means of an interface 37 (FIG. 5) in the evaluating unit 38. The operational sequence is in this case controlled by a control unit 39, it being also possible to carry out the three tasks of motor control, control and separation of the image elements, and signal conditioning or editing in an integrative manner.

Figure 6:
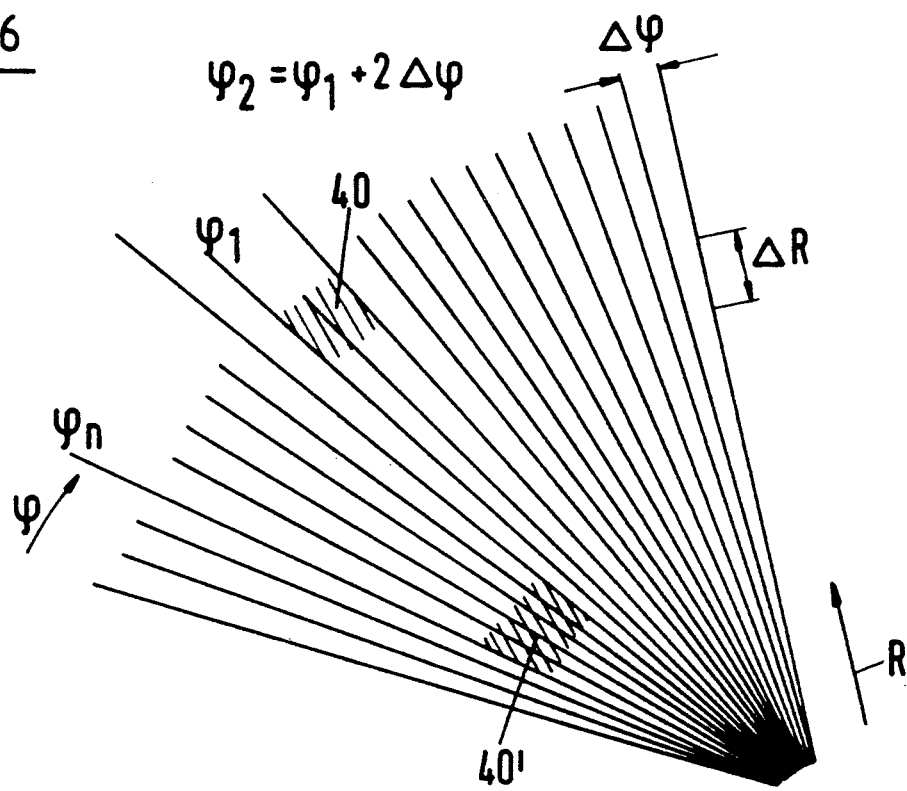
FIGS. 6 and 7 are diagrammatical illustrations of the approximation of the image element length.
Figure 7:
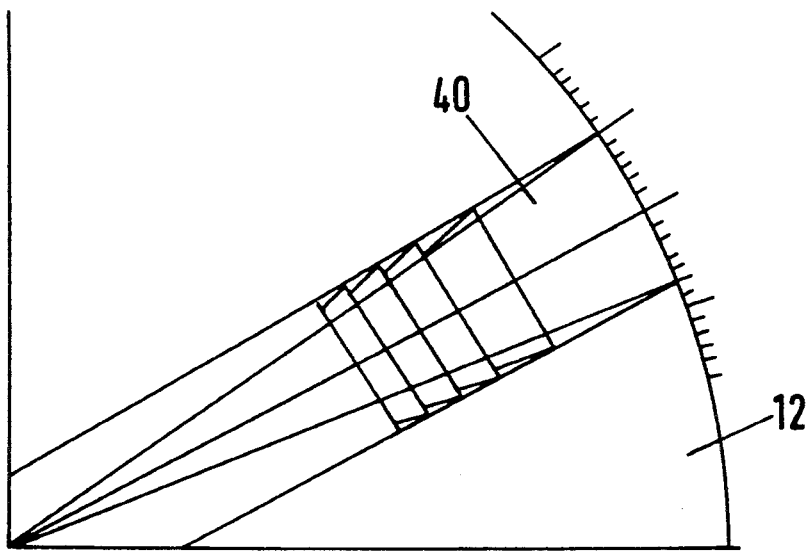
Figure 8:
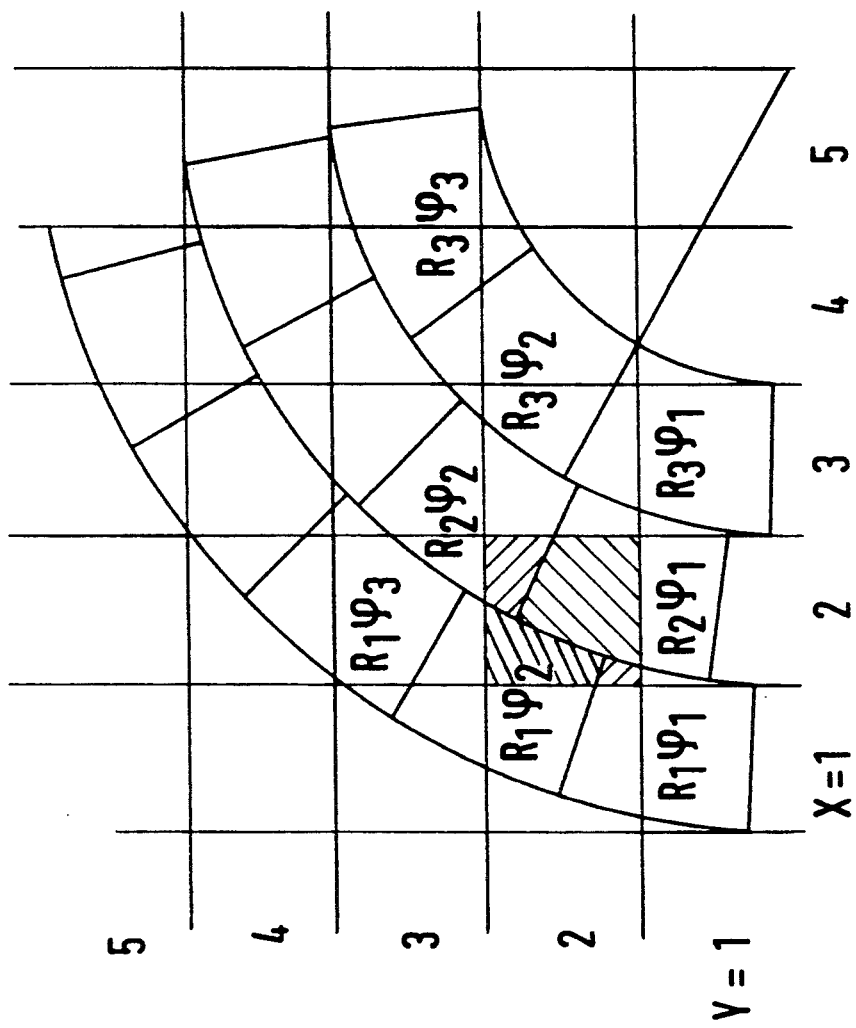
FIG. 8 shows a diagrammatical illustration of the image element transformation.

The basic problems involved in the scanning of a circular image plate along a spiral, and the technical solution thereof are diagrammatically explained with reference to FIGS. 6 to 8. As the image elements 40 are scanned, the image element widths are reduced in size with a diminishing radius. For that reason an increase in the widths of the image elements occurs in that, with a diminishing radius R, an increase of the rotational angle takes place (FIG. 6), which laterally delimits the respective elements 40. from this, with a decreasing radius of the spiral scanning operation, image elements 40 which possess different sizes result (FIG. 6). In the evaluating unit 38, by means of an algorithm, the spiral image dots are then converted into image dots of a Cartesian system of coordinates (FIG. 8). This may be effected in either an infinitesimal or a geometrical manner. Due to the invariabilities of the surface transformation, these are to be effected only once, in which connection it is possible to reuse the results in a tabulated list.

In the FIGS. 9 and 11, the pattern of the rate of advance of the image element scanning unit 15 is illustrated. The rate of advance begins at a lower value in the circumference of the image plate 12 and rises up to a maximum within the area of the central point (FIG. 13) of the image plate 12. The image element read head 30 is first made to approach the image plate 12 and, with an increase in the rotation speed for a brief period, is brought to the starting point 41 (FIG. 11). From here the change in rotation speed proceeds as depicted in FIG. 10, until the image element read head 30 has reached the area of the central point of the image plate 12. In the video scanner 10, the direction of rotation of the electromotor 11 is then changed, and the image element read head 30 is withdrawn at high speed across the image plate 12 (FIG. 11). At the same time, the residual quantity of light on the image plate 12 can be eliminated with the aid of illuminators.

On account of the inversely proportional dependence of the rate of advance on the radius, it is possible to achieve a constant scanning speed for each image element 40 of the image plate 12. Since the photomultiplier 36 and the parabolic reflector 52 (FIG. 12), which serves as light collector, move together with the means which emits the laser light, a maximum light yield is achieved for the light emitted from the image element 40. The use of two laser light sources in connection with a joint collector lens 47 is also of advantage since, in a compact model of the image plate scanner 10, the yield of the light scanning is significantly increased thereby. The measured values obtained by the spiral scanning of the image elements 40 are, with the aid of a conversion algorithm, converted from spiral coordinates into measured values of Cartesian coordinates. In the signal processing it is taken into consideration by means of approximation that the size of the image elements 40 across the image plate 12 is not constant, since the change of radii between the rings of the measuring spirals remains constant. The desired information that may be determined with the aid of the processing is the integrated intensity of the light per image element 40. The aim is the maximum utilization of the emitted light of the image plate 12. For the integration of the signal, a gate-controlled integrator is preferably used. No preamplifier is employed in order to prevent boosting of the background noise.

It is also possible, in lieu of analog control of the electromotor 11, to construct the same in the form of a stepping motor. In this case it will be necessary that no stepping losses occur and that, subsequent to the acceleration to the starting speed having taken place, no vibrations occur in the entire system. In this case, the stepping motor may be controlled with the aid of a quartz oscillator having a fixed or a variable series of pulses.

Figure 12:
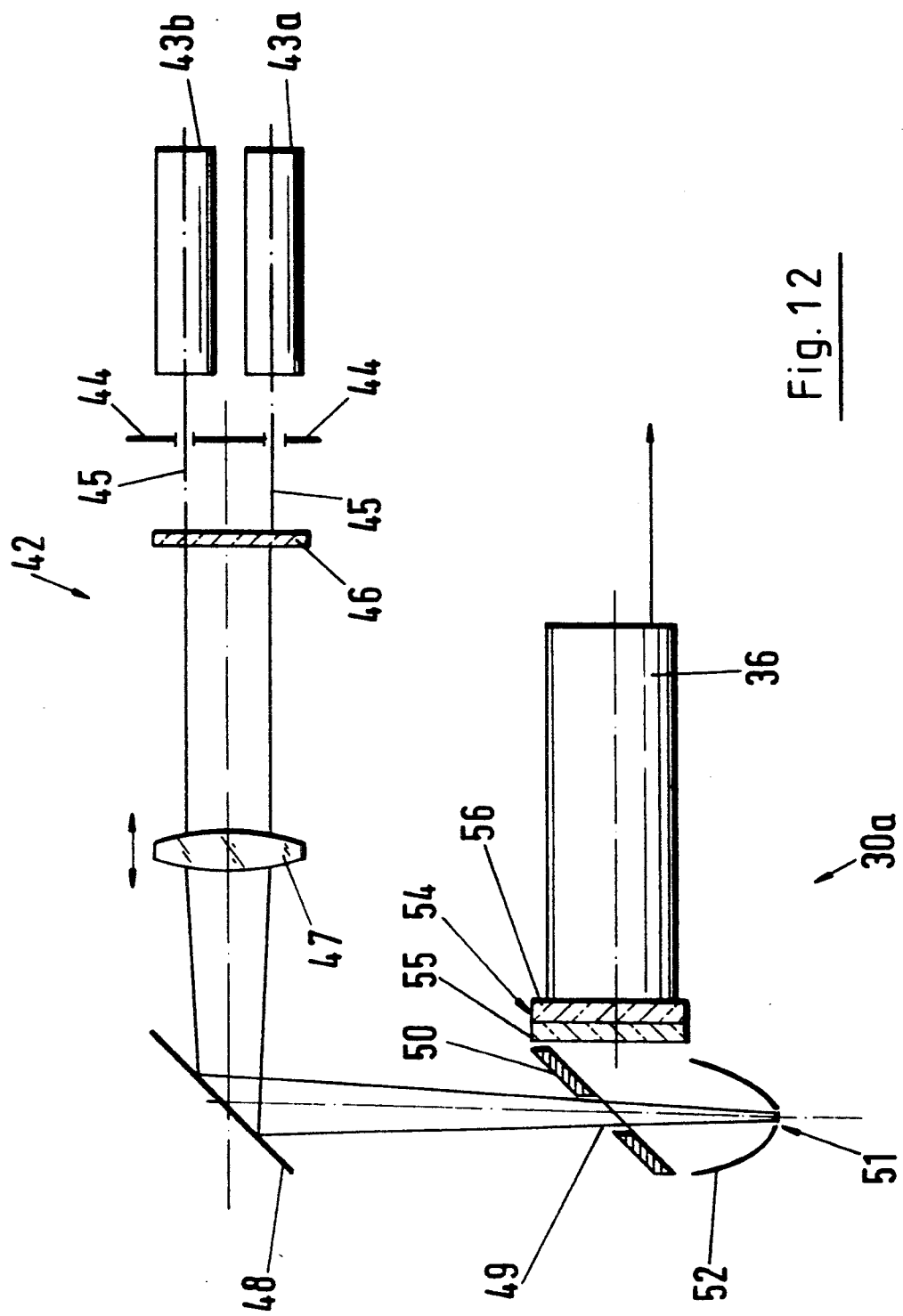
FIG. 12 is a diagrammatical illustration of the optical system of an image element scanning facility for the image plate scanner.

The optical system of the image element scanning unit 15 is shown diagrammatically in FIG. 12. The laser light supply means 42 includes two lasers 43a, 43b, whose laser light is passed through a pinhole diaphragm 44. The laser light beams 45 pass through a filter 46 which may be constructed in the form of a red filter, e.g. of the type OG 590. This filter serves to hold back blue laser light components. The laser light beams 45 which pass through the filter 46 are focussed by means of a collector lens 47. The collector lens 47 may be provided with a coating in order to eliminate reflections and is expediently displaceable in the axial direction so as to make it possible to change the diameter of the focus. The laser light issuing from the collector lens 47 is deflected by means of an adjustable deflector mirror 48, which is constructed so as to be highly reflective, and conveyed through the perforation 49 of an ultraviolet-reflective mirror 50, as well as through a perforation 51 of a reflector 52.

It is possible to dispose the lasers 43a, 43b, the pinhole diaphragm 44, the filter 46 and the collector lens 47 on the frame 110 of the image plate scanner 10 and to supply the laser light beams 45 via the deflector mirrors 53 of the image element scanning unit 15, or else they may be mounted stationarily within the housing of the image element scanning unit 15. The optical image element scanning facility 30a (FIG. 13) is comprised of the reflector 52, the mirror 50 and the photomultiplier 36. An optical filter 54 is inserted before the photomulitplier and consists of two blue filters 55, 56, e.g. of the type BF 12, BG 3. With the aid of this filter 54, red light components of the light reflected by the image plate 12 are filtered out. By preference, the inner wall of the reflector 52 is constructed so as to be polished. The reflector 52 may, in its cross-section, be parabolic, elliptical or otherwise of cylindrical constructional configuration.

In the FIGS. 13 to 16, a further embodiment of an image element scanning unit of an image plate scanner is illustrated.

Figure 13:
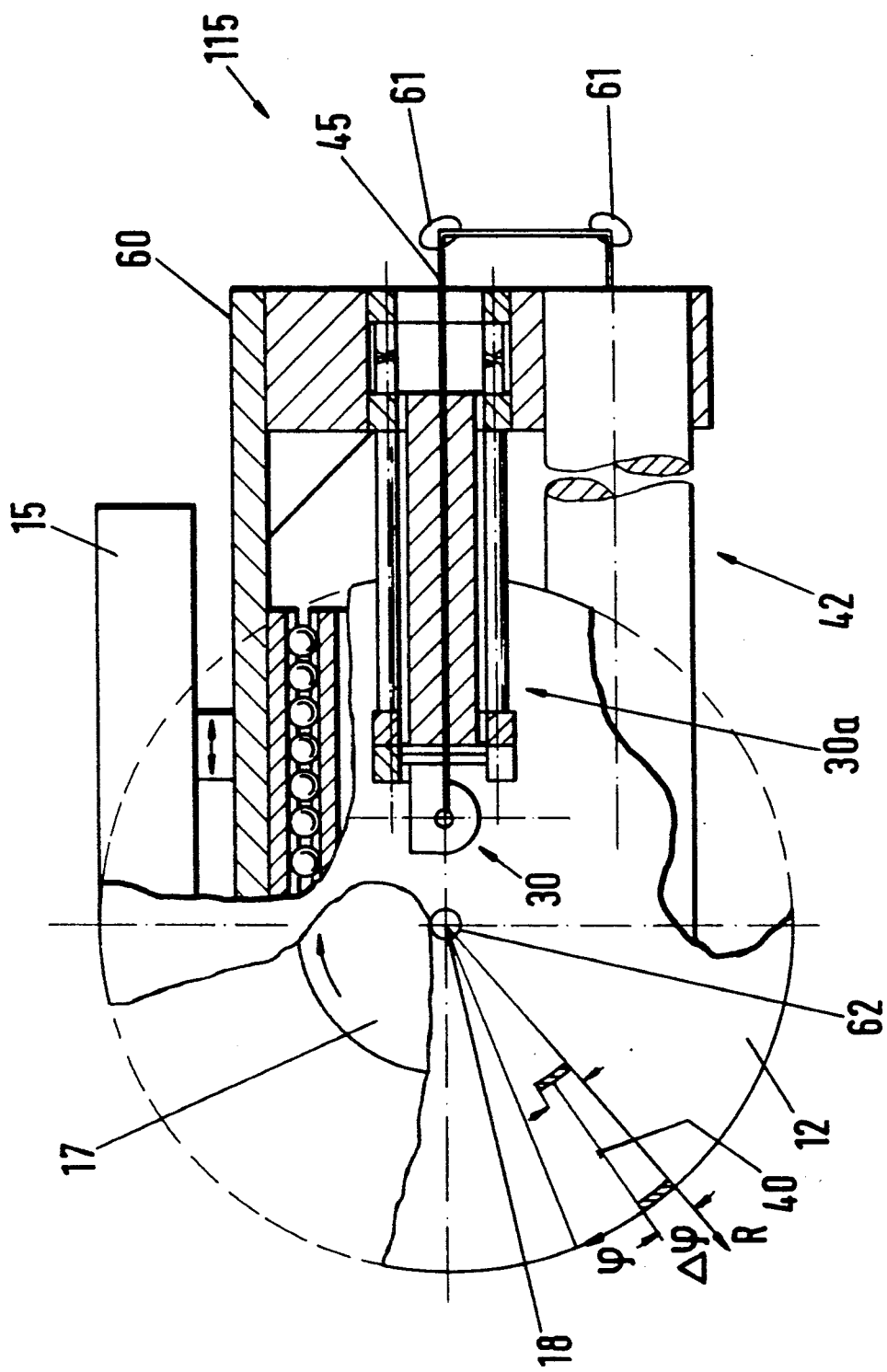
FIG. 13 shows, from the front, in a diagrammatical view, an image plate scanner in a detail drawing.

The FIG. 13 shows an image element scanning unit 115 as well as a image plate 12 in a top view. The image element scanning unit 115 is provided with a frame 60 which is radially displaceable across the image plate 12. The laser light supply means 42 and the optical image element scanning facility 30 are constructed within the frame 60. By means of the image element read head 30, it is possible to scan one image element 40 of the image plate 12 at a time. The image plate 12 is rotatably supported. With the aid of an indicated image plate rotational position coder 17 and the angular value generated therefrom and the number of the zero passes or transits of the image plate 12 of the radius R of the image element 40 calculable on the basis of constant advance, the measured values of the local fixation of each image element 40 can be supplied to the evaluating unit. An He-Ne laser may be employed as the laser. In the depicted embodiment, the laser light supply means 42 is of a two-piece construction, the laser light being deflected between the two parts with the aid of two mirrors 61.

In the FIG. 14, the image element scanning unit 115 according to FIG. 13 is depicted in a side elevation in section. The image element reading head 30 of the image element scanning unit 115 includes the reflector 52. As is shown in greater detail in FIG. 15, the reflector 52 is constructed inside a reflector housing 52a, while a perforation 51 is constructed in the tip 52b of the reflector 52. The perforation 51 serves to allow the laser light to pass through to receive the photooptical emissions of the crystals of image element 40 of the image plate 12 which are acted upon by the laser light. The mirror 50 is mounted above the reflector 52 which serves to deflect the photooptical emissions which enter through the perforation 51 on to the photomultiplier 36. An optical filter 54 with the blue filters 55, 56, is fitted before the photomultiplier 36. A perforation 49 is constructed in the mirror 50 and serves to lead to laser light beam 45 through the same. The laser light supply means 42 is mounted above the photomultiplier 36, but may also be mounted on the side. By means of a lateral disposition it is possible to reduce the constructional height of the image element scanning unit 115. The laser light supply means 42 is also in this case advantageously acted upon by two laser light sources whose laser light beams 45 are supplied through the filter 46 and the collector lens 47, by means of which the laser light beams 45 are focussed, and, via a deflector mirror 48, are conveyed in a concentrated beam through the perforation 49.

Figure 16:
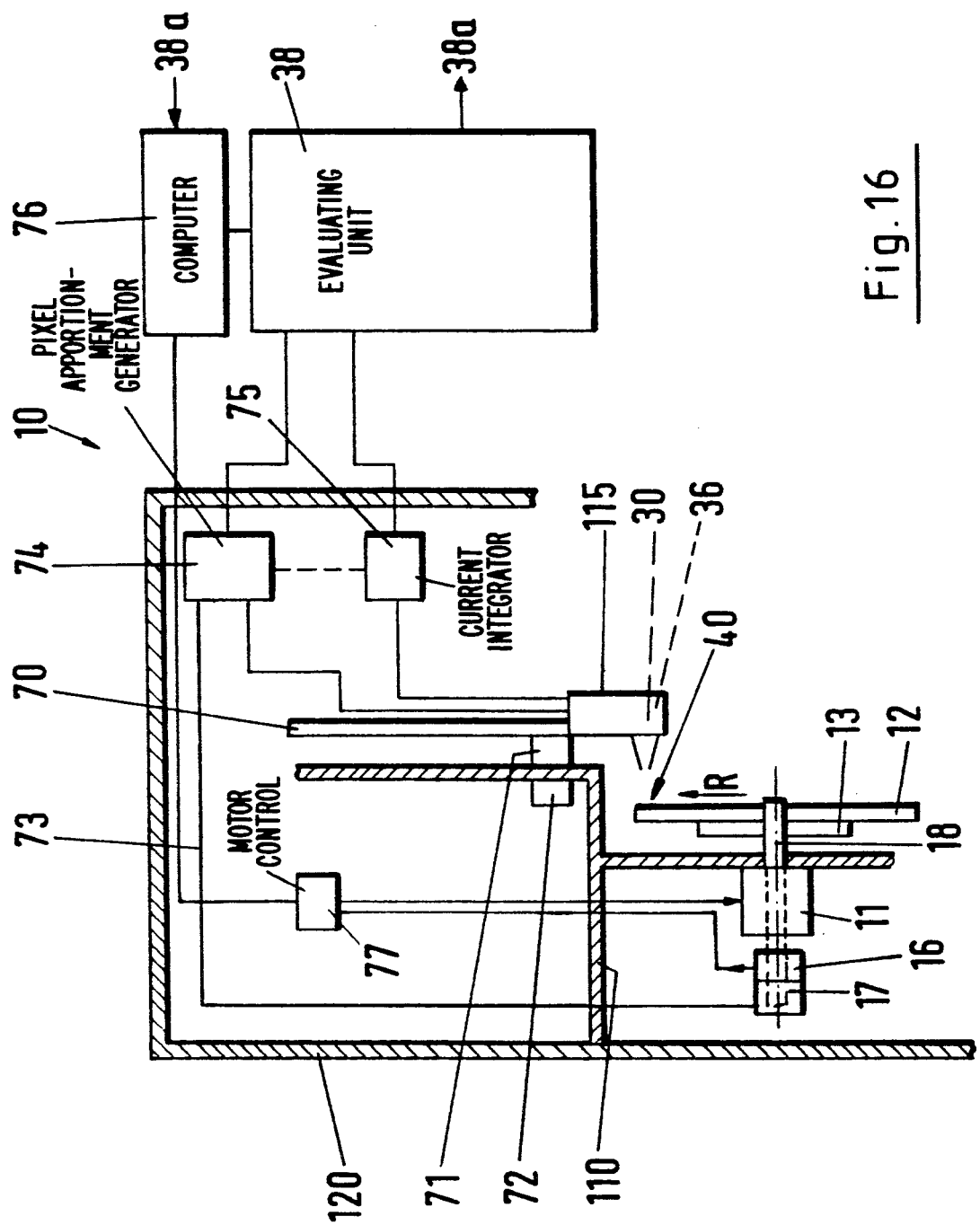
FIG. 16 shows a device for the scanning of a an image plate with an image plate scanner according to FIG. 13.

In FIG. 16, a further embodiment of an image plate scanner 10 is diagrammatically illustrated (in part). In this case, the frame 70 of the image element scanning unit 115 is displaceable on a retaining frame 110 by means of a stepping motor 71. The stepping motor 71 is connected to a control unit 72, with the aid of which the pattern of the speed of advance of the image element read head 30 of the image element scanning unit 115 is controlled inversely proportional to the respective radius R of the image element 40 of the image plate 12 by the determination of the respective rotational position from encoder 17 and the number of the zero passes (number of complete rotations), above which the image element read head 30 is located. The image plate 12 is located on an image plate carrier 13 which is mounted on the drive shaft of an electromotor 11 which serves as driving motor and which is secured to the retaining frame 110 or to the housing 120, respectively. The image plate rotational position coder 17 is, by means of a measured value transmission line 73, connected to a pixel apportionment generator 74. Generator 74 is connected to an evaluating unit 38 constructed in the form of an electronic calculating unit which, in turn, is connected to a computer 38a. The photomultiplier 36 is, by means of a current integrator 75, likewise connected to the evaluating unit 38. Through the latter, by means of a digitizer (not shown), the quantities of light picked up by the image element read head 30 are processed in the form of digitized signals into a digitized image which reproduces the image stored on the image plate 12. The pixel apportionment generator 74 and the current integrator 75 may also be accommodated in a separate electronic casing located outside the housing 120.

It is of advantage for the image plate rotational position coder 17 to be mounted on the drive shaft 18 of the electromotor 11, as is shown in the drawings. With this arrangement the rotational speed and the actual rotational angle phi is, if necessary, derived from a rotation speed generator 31 by means of the pulse signals of the image plate rotational position coder 17. The rotation speed profile which is inversely proportional to the radius R, is on this occasion stored in a servomotor control unit 76 within computer 38a in the form of a digital table and is compared with the actual value supplied by the tachogenerator 16, while a control signal is generated by the driving motor control unit 77 and supplied to the driving motor 11.

We claim:

1. An image plate scanner for laser beam scanning a circular image plate that has previously been exposed to X-rays to form thereon image elements spaced at radial distances from a central point of the image plate, said image plate scanner comprising a image plate carrier for carrying an image plate to be scanned; electromotor means for rotating said image plate carrier with an adjustable rotational speed with the image plate detachably mounted thereon; an image element scanning unit; a drive assembly for driving said image element scanning unit at a presettable speed of advance to radially displace said image element scanning unit across the image plate so that each image element is scanned at a constant tangential speed; laser light supply means; and an optical image element scanner including optoelectronic measured value transmission means, a photomultiplier and signal conditioning means.

2. An image plate scanner according to claim 1, wherein said drive assembly displaces said image element scanning unit radially over the image plate (12) at a speed inversely proportional to the radius of the respective image element being scanned.

3. Image plate scanner according to claim 1 or 2, wherein said image element scanning unit includes an image read head and means for positioning said image read head for reading of an image element on the image plate, and wherein said drive assembly includes means for driving said image element scanning unit at a speed inversely proportional to the radius of the image element being scanned.

4. An image plate scanner according to claim 3 further comprising coupling means rigidly coupling said electromotor means and said drive assembly, and wherein said drive assembly includes a gear drive connecting said coupling means to said image element scanning unit to adjust the rotational speed to be inversely proportional to the radial position of said image read head over an image element on the image plate (12).

5. An image plate scanner according to claim 3, wherein said image element scanning unit includes a servomotor and a control unit for displacing said image read head radially with a radial velocity inversely proportional to the radial position of said image read head over an image element on the image plate (12).

6. An image plate scanner according to claim 1, wherein said laser light supply means includes two laser light sources, a collector lens, and an optical filter (46), laser light from said two laser light sources passing through said collector lens and said optical filter to be focussed.

7. An image plate scanner according to claim 6, wherein said collector lens is coaxially displaceable relative to the laser light.

8. An image plate scanner according to claim 1, wherein said signal conditioning means comprises a current integrator, a pixel apportionment generator, and a digitizer for the digitization of images of image elements scanned on the image plate.

9. An image plate scanner according to claim 1, wherein said image element scanning unit includes laser light deflection means for deflecting light from said laser light supply means, and a housing fixedly mounting said laser light supply means.

10. An image plate scanner according to claim 1, wherein said image plate carrier includes a measured value receiver, and wherein said image element scanning unit includes an image plate rotational position coder for reading said measured value receiver.

11. An image plate scanner according to claim 10, wherein said image element scanning unit further includes a pixel apportionment generator for converting outputs of said image plate rotational position coder into pixel signals.

12. An image plate scanner according to claim 11, wherein said image element scanning unit further includes a measured value transmission line coupling said image plate rotational position coder to said pixel apportionment generator.

13. An image plate scanner according to claim 1, wherein said electromotor means includes a tachogenerator and a rotation speed generator.

14. An image plate scanner according to claim 1 or 13, wherein said electromotor means includes a motor having a drive shaft, and wherein said drive assembly includes a power spindle and a gear drive coupling said drive shaft to said power spindle (26) to translatorily displace said image element scanning unit radially with respect to the image plate (12).

15. An image plate scanner according to claim 14, wherein said drive assembly further includes a worm gear drive, a first toothed belt wheel mounted on said drive shaft, a second toothed belt wheel connected to said worm gear drive, and a toothed belt coupling said first and second toothed belt wheels.

16. An image plate scanner according to claim 14, wherein said image element scanning unit includes a head support for supporting said image element scanning unit, and guide rails in engagement with said power spindle for guiding movement of said head support to move said image element scanning unit.

17. An image plate scanner according to claim 1, wherein said image element scanning unit includes an image element read head, a reflector having a tip with an aperture therethrough for passing laser light to image elements on the image plate and for receiving photooptical emissions from the image elements on the image plate, a first mirror mounted above said reflector and on said photomultiplier, for deflecting entering photooptical emissions from the image elements, the mirror having a perforation for the laser light beam to pass through.

18. An image plate scanner according to claim 17, wherein said reflector has a cross-section of a paraboloid or an ellipsoid or a combination of both.

19. An image plate scanner according to claim 17, wherein said laser light supply means further includes a deflector mirror mounted above or at the side of said first mirror.

20. An image plate scanner according to claim 17, wherein said reflector includes an optical filter disposed before said photomultiplier, and whereby said photomultiplier and said current integrator form an optoelectronic measured value transmission means.

21. An image plate scanner according to claim 1, wherein said optical image element scanner further includes an optical filter before said photomultiplier.

* * * * *